Oct. 28, 1941.       W. GERBER       2,260,516
ROTAMETER
Filed June 22, 1939

WITNESS:

INVENTOR
Walter Gerber
BY
Augustus B. Stoughton
ATTORNEY.

Patented Oct. 28, 1941

2,260,516

UNITED STATES PATENT OFFICE 2,260,516

ROTAMETER

Walter Gerber, Philadelphia, Pa., assignor to Schutte & Koerting Company, Philadelphia, Pa., a corporation of Pennsylvania Application June 22, 1939, Serial No. 280,499

1 Claim. (Cl. 73—209)

The principal object of the present invention is to provide simple, reliable, efficient and comparatively inexpensive means for accurately indicating flow through the metering tube of a rotameter, even though the tube is not transparent, and at a point outside of the tube.

Other objects of the invention will appear from the following description at the end of which the invention will be claimed.

The invention comprises the improvements to be presently described and finally claimed.

Figure 2:
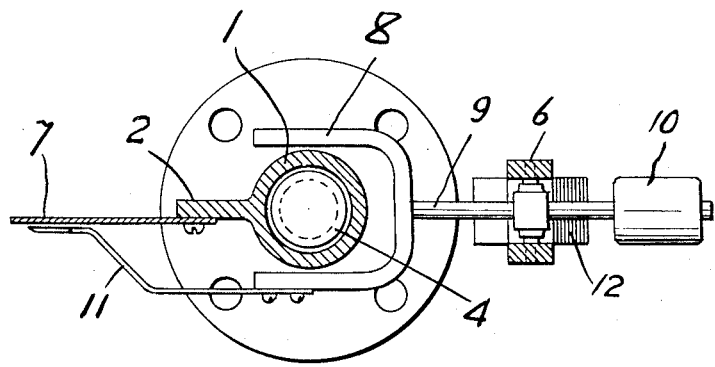
Figure 1:
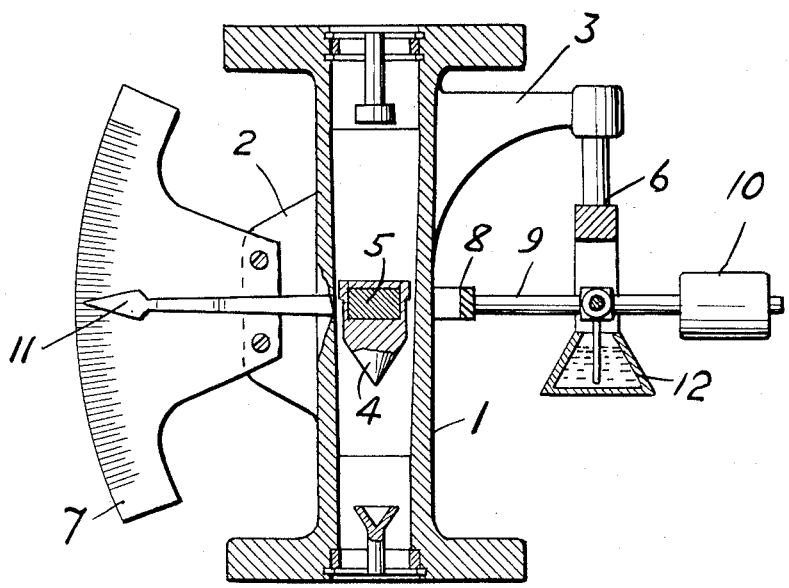

In the following description reference will be made to the accompanying drawing forming part hereof and in which, Figure 1 is a sectional view of so much and of such parts of a rotameter as is necessary for illustrating an embodiment of the invention; and Figure 2 is a transverse section of Figure 1.

Referring to the drawing, 1 indicates a metering tube of non-magnetic material and it is provided at one side with an ear 2 and at the other side with a bracket 3. This structure may be of non-magnetic metal or other material and it may be of opaque material. 4 indicates the rotatable, top shaped float of the rotameter arranged in the metering tube as usual and the float includes magnetic material 5. Since the float 4 of the rotameter is arranged in the metering tube as usual it follows that the float rotates on its vertical axis and this rotation tends to center it in the metering tube and keep it clear of the bounding wall of the metering tube. Armature 5 is arranged as a core in the body of the float so that the iron armature is protected from rust. The float is arranged to rise and fall in the metering tube 1 in consonance with flow through that tube. 6 is a post depending from the bracket 3 and having a bifurcated end. 7 is a scale carried by the lug 2 in fixed position. 8 is a horseshoe or permanent magnetic structure and it, or an extension 9 of it, is pivoted in the bifurcation with its legs astride the tube. 10 is a counter-weight for the magnet structure. 11 is an index carried by the magnetic structure and adapted to cooperate with the scale 7. 12 is a dash pot carried by the post 6 at the end of the bifurcation and it is operatively connected with the magnetic structure.

As the float rises or falls its armature 5 of magnetic material located as it is in the field of the magnet, causes the magnet to be magnetically coupled with the float and to follow the movements of the same turning on its pivot in the post 6; thus the indicator is moved and positioned in respect to the scale 7. On account of the described arrangement the float cannot lose the magnet and if these parts are forceably separated the float immediately again picks up the magnet. This is true, because in the absence of the core the magnet 8 and parts connected therewith are balanced by means of the counterweight 10 in respect to their pivot so that the magnet is normally in the position shown in Figure 1 and if moved from that position will automatically return to it. Furthermore the vertical movement of the float 4 is limited and is short enough to ensure that the float is always within the attraction of the magnet, so that if separated the magnet attracts the float and the two are brought together. It may be remarked that the normal position of the float 4 is indicated in the drawing. The function of the dash pot 12 is to oppose quick or sudden movements of the index and overthrow thereof. The armature 5 is located in the field of the magnet and the drawing shows that the armature and the magnet are of substantially the same width and they also show that the armature is rectangular in cross section or cylindrical in contour. It follows that the armature is in the magnetic field and in the lines of force thereof.

It will be obvious to those skilled in the art to which the invention relates that modifications may be made in details of procedure and in matters of mere form without departing from the spirit of the invention which is not limited to such matters or otherwise than the appended claim may require.

I claim:

In a rotameter, having a counterbalanced pivotally mounted index and its scale arranged outside of a metering tube of non-magnetic material and having a magnet carried by the index in proximity with the tube, the combination of a rotatable top shaped float which is self-centering in the tube and which rises and falls in and clear of the wall of the tube in consonance with flow through the tube, with an iron armature arranged as a core in the body of the float, the width of the armature and of the magnet being substantially the same and the armature being cylindrical, whereby the iron armature is protected from rust by the body of the float and accuracy is promoted by the absence of contact and friction between the float and the tube walls.

WALTER GERBER.